(12) United States Patent
De Vries et al.

(10) Patent No.: US 6,928,043 B2
(45) Date of Patent: Aug. 9, 2005

(54) COMPENSATING FOR SHERICAL ABERRATION INDUCED WHEN READING FROM OPTICAL RECORD CARRIERS WITH TRANSPARENT LAYERS OF DIFFERENT THICKNESS

(75) Inventors: Jorrit Ernst De Vries, Eindhoven (NL); Bernardus Hendrikus Wilhelmus Hendriks, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 382 days.

(21) Appl. No.: 10/008,196

(22) Filed: Nov. 8, 2001

(65) Prior Publication Data

US 2002/0122377 A1 Sep. 5, 2002

(30) Foreign Application Priority Data

Nov. 9, 2000 (EP) .......... 00203938

(51) Int. Cl.$^7$ .............. G11B 7/135
(52) U.S. Cl. .............. 369/112.06; 369/112.07; 369/112.12
(58) Field of Search .............. 369/112.03–112.07, 369/112.12

(56) References Cited

U.S. PATENT DOCUMENTS

| | | | | |
|---|---|---|---|---|
| 5,903,536 A | * | 5/1999 | Lee et al. .............. | 342/357.03 |
| 5,926,450 A | * | 7/1999 | Braat .............. | 369/53.2 |
| 6,016,293 A | * | 1/2000 | Lee et al. .............. | 369/44.25 |
| 6,091,691 A | * | 7/2000 | Yoo et al. .............. | 369/112.11 |
| 6,201,780 B1 | * | 3/2001 | Katayama .............. | 369/112.19 |
| 6,370,103 B1 | * | 4/2002 | Yamazaki et al. .............. | 369/112.26 |
| 6,687,209 B2 | * | 2/2004 | Ota et al. .............. | 369/112.08 |

FOREIGN PATENT DOCUMENTS

| EP | 0789355 A1 | 8/1997 | .......... G11B/7/135 |
|---|---|---|---|
| EP | 0859356 A2 | 8/1998 | .......... G11B/7/00 |

* cited by examiner

Primary Examiner—Hoa T. Nguyen
Assistant Examiner—Michael V. Battaglia
(74) Attorney, Agent, or Firm—Michael E. Belk

(57) ABSTRACT

A device for scanning a first and second type of optical record carriers (2, 40) generators a first and a second radiation beam for scanning the first and second type of record carriers, respectively. The information layers (4, 42) of the first and second type of record carriers is scanned through transparent layers (3, 41) of different thickness. The first radiation beam (17) has a first wavelength and a first numerical aperture $NA_{-1}$. The second radiation beam (46) has a different, second wavelength and an effective second numerical aperture $NA_2$ smaller $NA_1$. The rays of the second radiation beam having an NA smaller than $NA_2$ form a central sub-beam (48), the rays having a larger NA form an outer sub-beam (49). The device includes a non-periodic phase structure that does not affect the first radiation beam. The phase structure introduces an amount of spherical aberration in the central sub-beam (48). The phase structure is transparent for the central and outer sub-beam (48, 49). The introduced spherical aberration compensates the difference in spherical aberration caused by the difference in thickness of the transparent layer (3, 41) of the first and second type of record carriers (2, 40). To reduce the amount of stray light falling on the detection system (25) from rays in the outer sub-beam (49), the phase structure introduces an amount of defocus in the second radiation beam (17). The defocus displaces the focus of the central sub-beam with respect to the focus of the outer sub-beam, causing the intensity distribution of the central and outer sub-beam split in two separate distributions. If the position and size of the detection system are properly chosen, the detection system will capture mainly rays from the central sub-beam and not from the outer sub-beam. Hence, the displacement of the foci allows spatial filtering in the plane of the detection system (25) of the desired and undesired rays of the second radiation beam.

14 Claims, 5 Drawing Sheets

COMPENSATING FOR SHERICAL ABERRATION INDUCED WHEN READING FROM OPTICAL RECORD CARRIERS WITH TRANSPARENT LAYERS OF DIFFERENT THICKNESS

The invention relates to an optical head for scanning a first and a second, different type of record carrier. The invention also relates to a device for scanning two different types of optical record carrier, the device including the optical head. Both types of record carriers have an information layer and a transparent layer through which a radiation beam can scan the information layer. The thickness of the transparent layer is different for the two types of record carrier. The optical head includes a radiation source for generating a first radiation beam having a first wavelength for scanning record carriers of the first type and a second radiation beam having a second, different wavelength for scanning a record carrier of the second type. The first radiation beam has a larger effective numerical aperture than the second radiation beam for scanning the information layer.

Progress in the field of optical recording results in the regular market introduction of new optical record carriers with higher information densities. In general, such record carriers are designed for being scanned with a radiation beam of a wavelength and numerical aperture different from that used for scanning a previous generation of record carriers. It is desirable that a scanning device designed for the new record carriers can also scan the older record carriers. The scanning device must therefore be adapted in such a way that it can provide two types of radiation beam, one for each type of record carrier. The properties of the radiation beams depend on the characteristics of the record carriers. The wavelength of the radiation beam depends on the wavelength dependence of the optical properties of the marks of the record carrier in which the information is recorded. The wavelength and the numerical aperture of the radiation beam, determining the resolution with which the scanning can be performed, depend on the dimensions of the marks. The amount of spherical aberration compensation of the radiation beam depends on the thickness of the transparent layer of the record carrier through which the radiation beam scans the information layer. For example, a device suitable for scanning a record carrier of the so-called DVD type, provides a first radiation beam having a wavelength of 660 nm, a numerical aperture (NA) of 0.6 and a spherical aberration compensation for a record carrier substrate thickness of 0.6 mm. In order to write previous generation record carriers of the so-called CD type, the device also provides a second radiation beam having a wavelength of 785 nm, an NA of 0.50 and a spherical aberration compensation for a record carrier substrate thickness of 1.2 mm. The device is preferably provided with a single objective system for focussing the radiation beam onto the record carrier in order to keep the manufacturing costs low. The change in numerical aperture is achieved by changing the diameter of the radiation beam incident on the objective system.

The article "Dual-wavelength optical head with a wavelength-selective filter for 0.6-and 1.2-mm-thick-substrate optical disks" by Katayama et al, published in the journal Applied Optics, Vol. 38, No. 17, pages 3778 to 3786, Jun. 10, 1999, discloses an optical head having a single objective system for use in a device that can scan records of both the DVD and CD type. The radiation source generates the first and second radiation beam for scanning a DVD and CD record, respectively. An optical system focuses the radiation beams on the information layer of the record carrier. The optical system includes an optical element in the form of a plane parallel plate carrying a non-periodic phase structure. The diameters of the first and second radiation beam are approximately equal in the plane of the optical element. The second radiation beam can be regarded as comprising a central sub-beam and an outer sub-beam. The first radiation beam is focussed on the record carrier of the DVD type at a first numerical aperture of 0.6, the central sub-beam is focussed on the record carrier of the CD type at a second numerical aperture of 0.45. The phase structure includes a plurality of concentric areas forming a pattern of optical paths that introduces a wavefront deviation in the radiation beam passing through the phase structure. The phase structure has a diameter corresponding to the central sub-beam and induces spherical aberration in the central sub-beam to compensate for the difference in thickness of the transparent layers. The height difference between neighbouring areas is such that the optical path difference between the areas is equal to an integer times the first wavelength, thereby making the phase structure inactive for the first radiation beam. A thin-film interference stack is arranged on the optical element around the phase structure. The interference stack is designed to transmit the first radiation beam and to block the outer sub-beam. Thus, the optical element transmits the first radiation beam without affecting its wavefront and with a diameter corresponding to the larger, first numerical aperture, it transmits the central sub-beam, introducing spherically aberration and with a diameter corresponding to the smaller, second numerical aperture and it blocks the outer sub-beam, i.e. the rays in the second radiation beam lying outside the central beam.

A disadvantage of this known optical head is the relatively high cost of the element caused by the presence of both a phase structure and a thin-film stack. Moreover, the thin-film stack is complicated, because it must introduce a predetermined phase shift in the first radiation beam in order to achieve the same phase of the wavefront for the part of the radiation beam that has been transmitted through the stack as for the part that has been transmitted through the phase structure.

It is an object of the invention to provide an optical head including a less expensive optical element having a phase structure.

The object of the invention is achieved by an optical head for scanning a first optical record carrier including a first information layer and a first transparent layer having a first thickness and for scanning a second optical record carrier including a second information layer and a second transparent layer having a second thickness different from the first thickness, the head including a radiation source for generating a first radiation beam having a first wavelength and a second radiation beam having a second wavelength different from the first wavelength, the second radiation beam including a central sub-beam and an outer sub-beam, an optical system for converging the first radiation beam through the first transparent layer to a focus on the first information layer and for converging the second radiation beam through the second transparent layer to a focus on the second information layer, and a detection system for receiving radiation of the first and second radiation beam from the information layer and including a photo-sensitive area arranged in a detection plane, the optical system including an optical element having a non-periodic phase structure, the phase structure including a plurality of concentric areas inducing a wavefront deviation in the first radiation beam that globally approximates a flat wavefront deviation and inducing a wavefront deviation in the central sub-beam that compensates the difference in spherical aberration due to the first and second transparent layer, wherein according to the invention, the optical element is transparent for the first radiation beam and for the central sub-beam and the outer sub-beam of the second radiation beam, and the wavefront deviation induced in the second radiation beam is such that, when the focus of the central sub-beam is located on the second information layer, the radiation of the central sub-beam and the outer sub-beam form a central intensity distribution and an outer intensity distribution, respectively, in the detection plane, the central intensity distribution and the outer intensity distribution being separated by a substantially dark area, and the photo-sensitive area captures radiation of substantially only the central distribution.

The optical element according to the invention need not have a thin-film stack such as present in the known optical head that blocks the outer sub-beam and is transparent to radiation of both the first and second wavelength over substantially the entire diameter of the first and second radiation beam. Since a thin-film stack is not necessary in the head according to the invention, the manufacture of the optical element including the phase structure will be cheaper. Moreover, the absence of the thin-film stack makes it simpler to achieve a flat wavefront over the entire diameter of the first radiation beam, because the correct phase of the first radiation beam can be attained by a judicious choice of the thickness of the areas of the phase structure over the entire diameter of the first radiation beam. The optical element may be any element in the optical system that can support the phase structure, e.g. a plane parallel plate, a beam splitter or a lens.

The phase structure corrects the central sub-beam for the difference in spherical aberration, resulting in a spot of good quality on the second information layer and a central intensity distribution of relatively small extent in the detection plane. The absence of the thin-film stack causes radiation of the second radiation beam outside the first numerical aperture to reach the record carrier. Since the outer sub-beam is not corrected for the spherical aberration of the second transparent layer, it will show a relatively large aberration due to deviating thickness of the second transparent layer. Rays of the outer sub-beam will reach the detection plane, where they will form a radiation distribution that has an extent substantially larger than the extent of the central intensity distribution. When both distributions of radiation in the detector plane overlap, radiation of both the central and outer sub-beam will be incident on the photo-sensitive area of the detection system. In such a case it is difficult to discriminate between rays of the central sub-beam and those of the outer sub-beam, i.e. between radiation having a numerical aperture smaller than the second numerical aperture and that having a larger numerical aperture. If the detection system captures rays having a larger numerical aperture results in scanning the second record carrier with a numerical aperture larger than the desired second numerical aperture. Since tilt of the record carrier introduces a comatic wavefront error proportional to the cube of the numerical aperture, an increase of the scanning numerical aperture reduces the tolerance on the tilt of the record carrier. Moreover, rays from the outer sub-beam may increase the noise in the electrical signals generated by the detection system.

If the wavefront deviation induced by the phase structure in the second radiation beam is properly chosen, the outer sub-beam will form a radiation distribution that does not overlap the central distribution. This so-called outer intensity distribution is separated from the central intensity distribution by a substantially dark area. The separation between the two distributions allows spatial filtering of the rays in the second radiation beam, which is realized by arranging the photo-sensitive area of the detection system such that it captures mainly rays of the central intensity distribution. The record carrier will then be scanned with the desired numerical aperture. Hence, the outer intensity distribution can effectively be kept away from the detection system using a relatively inexpensive optical element having a non-periodic phase structure.

The word 'mainly' means that less than about 30% of the intensity of the outer intensity distribution falls on the photo-sensitive area, preferably less than 10%.

The rays of the outer sub-beam may be intercepted in the optical system before the detection system by means of a diaphragm to prevent them from falling on the radiation-sensitive area of the detection system. However, the edge of the radiation-sensitive area is preferably arranged in the dark area of the intensity distribution, thereby effecting the spatial filtering. The detection system can be arranged in the central intensity distribution without tight tolerances on its position or dimensions.

The separation of the central and outer intensity distribution may be realised by an appropriate combination of thickness difference of the first and second transparent layer and the second numerical aperture. When the thickness of the second transparent layer is larger than that of the first transparent layer, the focus of the outer sub-beam, which is not corrected for the spherical aberration due to the thickness difference, is changed from the position of the second information layer to a position on the optical axis of the objective system further removed from the objective system. In other words, the marginal focus of the second beam is further removed from the objective system than the paraxial focus of the second beam. When the focus of the central sub-beam is located on the second information layer of the record carrier of the second type, the radiation of this sub-beam forms a central intensity distribution in the detection plane. The focus of the outer sub-beam is axially displaced with respect to the focus of the central sub-beam, causing the radiation of the sub-beam to be out of focus in the detection plane, thereby forming an annular, outer intensity distribution in the detection plane having the same centre as the central area. If the amount of defocus is correct, the central and the outer distribution will be separated by a dark area, and spatial filtering is possible.

In a special embodiment the phase structure according to the invention introduces spherical aberration and defocus in the second radiation beam, the defocus affecting the axial distance between the focus of the central sub-beam and the focus of the outer sub-beam.

In a special embodiment the phase structure introduces the defocus in the central sub-beam. The extent of the phase structure can be limited to the cross-section of the central sub-beam in the plane of the optical element. A focus servo system of the optical head will cause the focus of the central sub-beam to be located in the plane of the second information layer, and the focus of the outer sub-beam will be located closer to or further away from the objective lens than the plane.

In another embodiment the phase structure introduces the defocus in the outer sub-beam. The phase structure will then extend over the entire diameter of the second radiation beam. In the case of a displacement of the focus of the outer sub-beam in the direction of the objective system, the complexity of the phase structure for introducing the spherical aberration will be reduced if the defocus is not introduced in the section of the phase structure in which the spherical aberration is introduced.

The effect of the phase structure on the first radiation beam is minimized, i.e. the phase structure introduces a globally flat wavefront deviation, if, preferably, the difference between the optical paths of neighboring areas of the phase structure are substantially equal to an integer times the first wavelength.

Preferably, the amount of defocus is at least 12.5 $\mu$m to have a dark area of a reasonably size.

A further aspect of the invention relates to a device for scanning two types of optical record carrier, the device including the above optical head and an information-processing unit for error correction. The reduction of the amount of stray light on the detector when scanning a record carrier of the second type reduces the noise in an electrical information signal generated by the detection system and representing the information read from the record carrier. The phase structure also increases the tilt margin of the second record carrier, thereby reducing the amount of the coma in the radiation beam and the associated track-to-track cross talk and inter-symbol interference. The higher quality of the information signal reduces the number of errors in the signal, thereby reducing the demand imposed on the information-processing unit for error correction.

The objects, advantages and features of the invention will be apparent from the following more particular description of preferred embodiments of the invention, as illustrated in the accompanying drawings, in which FIG. 1 shows a scanning device according to the invention;

Figure 1:
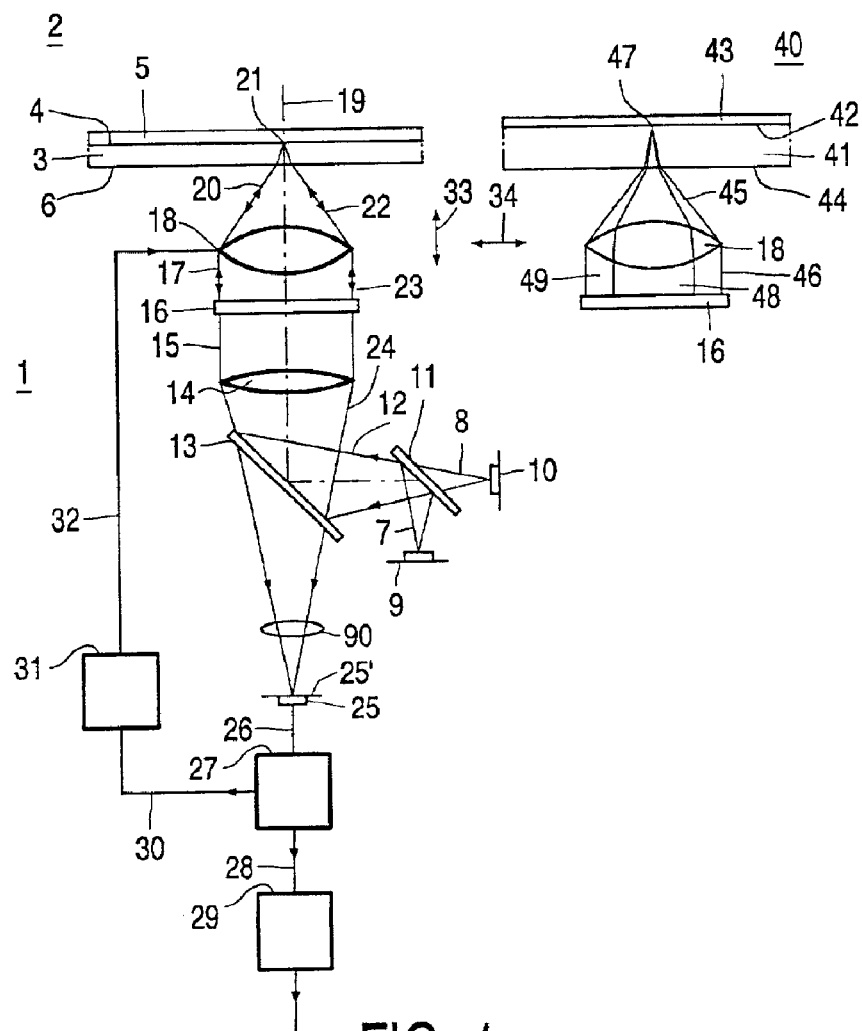

FIG. 1 shows a device 1 for scanning a first optical record carrier 2 of a first type and a second record carrier 40 of the second type. In the embodiment shown in the first type is the digital versatile disc (DVD) and the second type is the writable Compact Disc (CD). The record carrier 2 comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support for the information layer is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device 1 comprises a radiation source that can emit a first and a second radiation beam 7 and 8 having different wavelengths. The radiation source shown in the Figure comprises two semiconductor lasers 9 and 10, emitting the radiation beams 7 and 8. A beam combiner 11, for example a semitransparent plate, combines the paths of the two beams 7 and 8 to a single optical path. The two radiation sources may be combined on a single substrate, and the beam combiner 13 may be dispensed with if the two sources are sufficiently close together. The first radiation beam 7 is used for scanning optical record carrier 2 of the first type. The second radiation beam 8 is used for scanning optical record carrier 40 of the second type. A second beam splitter 13 reflects the diverging radiation beam 12 coming from the beam combiner 11 on the optical path towards a collimator lens 14, which converts the diverging beam 12 into a collimated beam 15. The collimated beam 15 is incident on a transparent optical element 16, which modifies the wavefront of the collimated beam. The beam 17 coming from the optical element 16 is incident on an objective system 18. The objective system may comprise one or more lenses and/or gratings. The transparent optical element 16 may be integrated in the objective system 18. The objective system 18 has an optical axis 19. The objective system 18 changes the beam 17 to a converging beam 20, incident on the entrance face 6 of the record carrier 2. The objective system has a spherical aberration correction adapted for passage of the first radiation beam through the thickness of the transparent layer 3. The converging beam 20 forms a spot 21 on the information layer 4 of the first record carrier 2. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system is provided with a radiation-sensitive area lying in a detection plane 25. The radiation-sensitive area of the detection system captures the radiation and converts it into electrical output signals 26. A signal processor 27 converts these output signals to various other signals. One of the signals is an information signal 28, the value of which represents information read from the information layer 4. The information signal is processed by an information-processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of the track to be followed in the information layer 4. The tracks in the Figure run in a direction perpendicular to the plane of the Figure.

The device of FIG. 1 is adapted according to the invention to scan also the second record carrier 40 of the second type. This record carrier comprises a thicker transparent layer 41 than the first record carrier 2, an information layer 42, a protective layer 43 and an entrance face 44. The device uses the second radiation beam 8 for scanning the information plane 42. The numerical aperture (NA) of the second radiation beam may be adapted to obtain a converging beam 45 having an NA suitable for forming a focal spot 47 for scanning the information layer 42. Suitable values of the NA are a first numerical aperture $NA_1$ of 0.6 for the DVD type record carrier and a second numerical aperture $NA_2$ of 0.5 for the writable CD type record carrier. In general, the second radiation beam 46 will have a larger diameter than required to form the converging beam 45. The part of second radiation beam 46 that forms the converging beam 45 is called the central sub-beam 48 and the annular part of the second radiation beam around the central sub-beam the outer sub-beam 49.

The spherical aberration compensation of the objective system 18 is not adapted to the thickness of the transparent layer 41 because of the different wavelength and different thickness of the transparent layer. The optical element 16 is designed to introduce a wavefront deviation having amongst others the form of spherical aberration when the second radiation beam passes through it. The spherical aberration introduced in the central sub-beam 48 incident on the objective system is chosen such, that the combined spherical aberration introduced in the radiation beam by the optical element 16 and the objective system 18 compensates the spherical aberration incurred by the radiation beam in passing the transparent layer 41.

Figure 2:
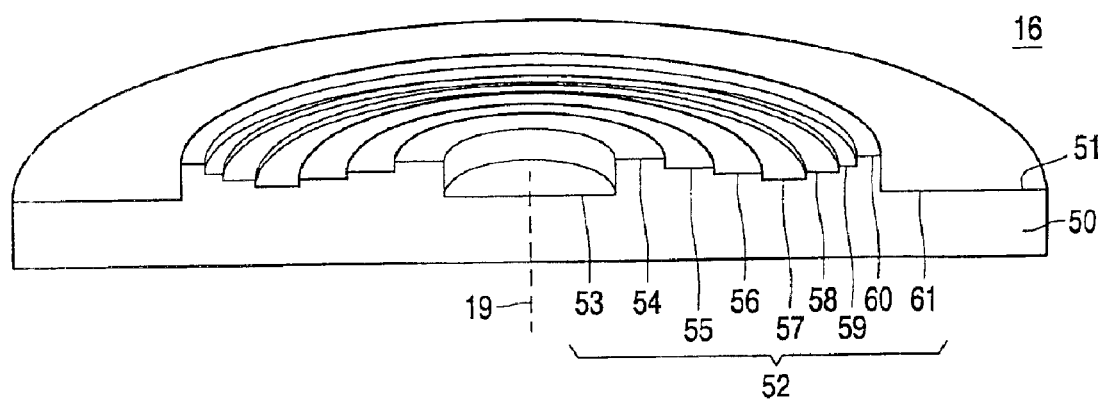
FIG. 2 shows an optical element having a conventional phase structure.

FIG. 2 shows as an example a cross-section through the optical axis 19 of the optical element 16. The optical element comprises a transparent plate 50, one surface 51 of which is provided with a phase structure 52, which is rotationally symmetric around the optical axis 19. The phase structure in the figure has a central area 53 and eight concentric annular areas 54 to 61. The areas have different heights, giving rise to different optical paths of the rays of a radiation beam transmitted through the optical element. The height of the areas in the Figure is exaggerated with respect to the thickness and radial extent of the plate 50. As will be explained below, a proper design of the phase structure allows the introduction of a predetermined wavefront deviations in the first and second radiation beam having wavelength $\lambda_1$ and $\lambda_2$, respectively. In the embodiment of the device shown in FIG. 1, the phase structure introduces no wavefront deviation in the first radiation beam, spherical aberration and possibly defocus in the central sub-beam of the second radiation beam and no wavefront deviation in the outer sub-beam of the second radiation beam.

Figure 3A:
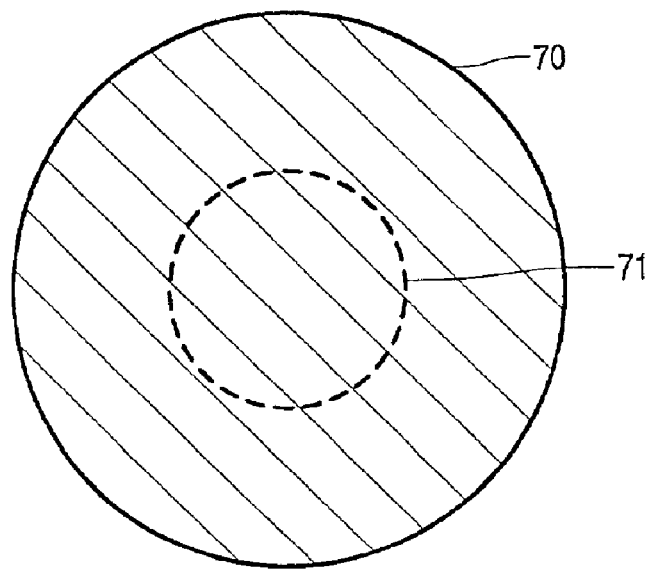
FIGS. 3A and 3B show the radiation distribution in the plane of the detection system for the conventional phase structure and that according to the invention.

If the wavefront deviations introduced by the phase structure are not properly chosen, the intensity distribution in the plane of the detection system will have the form of the distribution 70 as shown in FIG. 3A. The distribution has the highest intensity in the centre, decreasing away from the centre. The dashed circle 71 is the circle within which the rays with numerical aperture smaller than $NA_2$ lie, i.e. the rays from the central sub-beam 48, and which should be captured by the detection system. The rays from outer sub-beam 49 fall partly inside and partly outside this circle and cause noise in the electrical signals generated by the detection system and decrease the tolerances of the device. It is difficult to arrange a detection system such that it captures only rays form the central sub-beam 48.

Figure 3B:
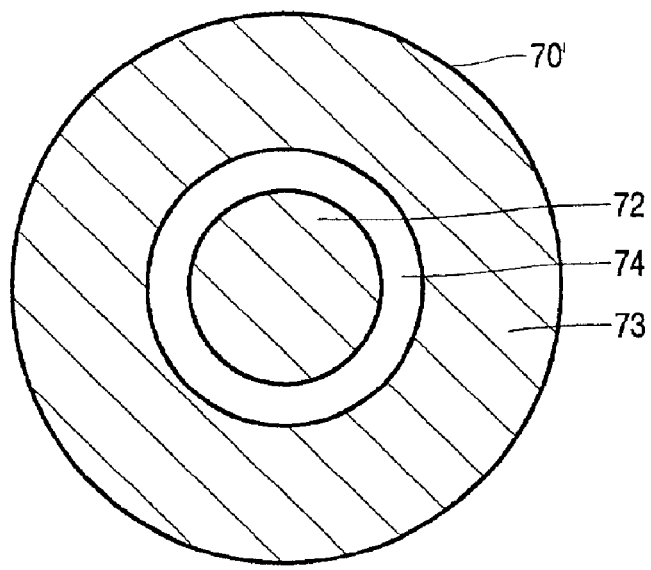

FIG. 3B shows the radiation distribution 70' in the plane of the detection system 25 of the second radiation beam when using a properly designed phase structure. In the plane of the detection system a central intensity distribution 72 and an annular, outer intensity distribution 73 can be distinguished, separated by a ring-shaped dark area 74. The rays from the central sub-beam, having a numerical aperture smaller than $NA_2$, are confined to the central distribution 72. The rays from the outer distribution, having a larger numerical aperture, fall in the outer distribution 74. The phase structure according to the invention provides a proper separation of the two distributions, allowing an accurate spatial separation of the desired and undesired rays. The dark ring allows a proper positioning of the detection system, relatively independent of the actual dimensions of the radiation sensitive area of the detection system. It turns out, that an axial shift in position of the focus of the central sub-beam on the information layer 42 and the focus of the outer sub-beam facilitates the creation of the dark area.

Figure 4:
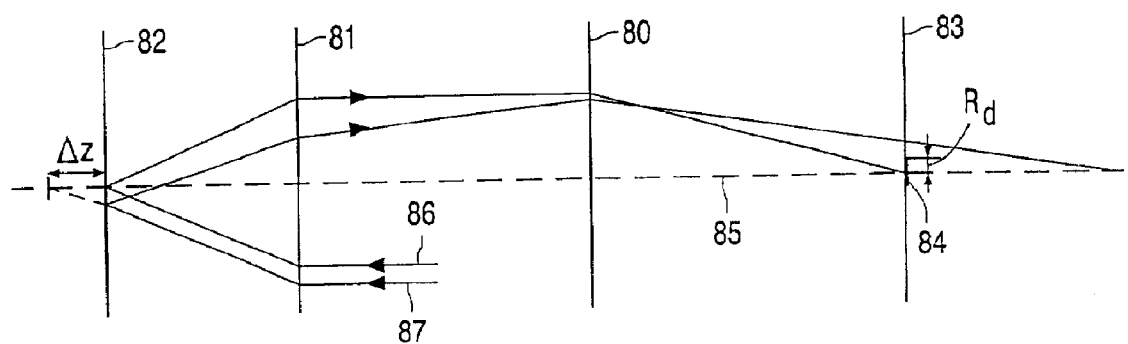
FIG. 4 shows a schematic cross-section of the optical path of the scanning device.

The effect of the introduction of the focus offset between the focus of the central sub-beam and that of the outer sub-beam will be explained with reference to FIG. 4. The collimator lens 14 is indicated by line 80, the objective system 18 by line 81, the information layer 42 by line 82 and the detection plane 25' by line 83. The extent of the radiation-sensitive area of the detection system is indicated by the bold line 84. The optical axis is indicated by the dashed line 85. For this Figure the optical element is regarded as being integrated in the objective lens. The first part of this explanation assumes, that the record carrier 40 has no transparent layer 41 which transmits the radiation to the information layer 42. A ray 86 at a radius of the radiation beam pertaining to an NA smaller than $NA_2$ is focussed by the objective system 81 at the information layer 82 on the optical axis 85. After reflection, the ray is collimated by the objective system 81 and converged by the collimator 80 to cross the detection plane 83 on the optical axis. A ray 87 is at a radius of the radiation beam pertaining to an NA larger than $NA_2$ and, before incidence on the objective system, runs parallel to ray 86. The amount of defocus imparted by the objective system is different for rays in the central sub-beam having an $NA<NA_2$ and rays in the outer sub-beam having an $NA>NA_2$. The example of FIG. 4 shows an objective system having a larger focus distance for the outer sub-beam than for the central sub-beam. The distance $\Delta z$ between the two foci is taken to be negative, if the defocus of the central sub-beam increases the distance between the objective system and the focus of the central sub-beam. The value of $\Delta z$ in the figure is negative.

The ray 87 would cross the optical axis at a distance $\Delta z$ away from the intersection of the information layer 82 with the optical axis. However, the reflection on the information layer redirects the ray towards the objective system 81. The objective system 81 and the collimator lens 80 cause the ray to cross the optical axis behind the detection plane 83. The ray will not be intercepted by the radiation-sensitive area 84, provided the extent of the area is sufficiently small. From a paraxial calculation it follows that the ray 87 with numerical aperture NA on the information plane 82 intersects the detection plane 83 at a height r given by $$r(NA) = \left|2NA\frac{F_{servo}}{F_{obj}}\Delta z\right| \quad (1)$$

where $F_o$ and $F_c$ are the focal lengths of the objective system and the collimator lens, respectively. No rays pertaining to an NA larger than $NA_2$ will fall on the radiation-sensitive area 84, having a radius $R_d$, when $$|\Delta z| > \frac{R_d F_{obj}}{2NA_2 F_{servo}} \quad (2)$$

When $R_d$=50 μm, $F_{obj}$=2.75 mm, $F_{servo}$=11 mm and $NA_2$=0.50, the absolute value of $\Delta z$, $|\Delta z|$, must be larger than 12.5 μm.

When the record carriers are provided with transparent layers 3 and 41 of different thickness, the rays will incur an amount of spherical aberration depending on the type of record carrier. The spherical aberration arising due to the difference $\Delta d$ in thickness of the transparent layers is given by $W_{disc}(\rho)$ with $\rho$ the pupil coordinate normalised on $NA_2$, i.e. $\rho$=1 corresponds to $NA_2$. In this example the phase structure on the optical element compensates $W_{disc}(\rho)$ for the central sub-beam, i.e. for rays having NA<$NA_2$ and introduces a defocus corresponding to an axial shift of the focus equal to $\Delta z$ also for the central sub-beam. The outer sub-beam is not compensated for the difference $\Delta d$ in thickness nor shifted in focus. In the presence of aberrations the outer sub-beam has a position of its best focus which is displaced by a distance $\Delta z_b$ from the focus position without aberrations. The rays of the outer sub-beam will not impinge on the radiation-sensitive surface 84, if the axial distance between the focus of the central sub-beam and the focus of the outer sub-beam complies with $$|\Delta z - \Delta z_b| > \frac{R_d F_{obj}}{2NA_2 F_{servo}} \quad (3)$$

An estimate of the value of $\Delta z_b$ can be obtained considering third order aberration only. The total wavefront aberration $W(\rho)$ consisting of the wavefront aberration $W_{disc}(\rho)$ due to the difference $\Delta d$ in thickness and the wavefront aberration due to a focus offset $\Delta z_b$ of the focus of the outer sub-beam is given by $$W(\rho) = W_{disc}(\rho) + W_{focus\_out}(\rho) \quad (4)$$

with $$W_{disc}(\rho) = -\frac{1}{8}\Delta d\frac{n^2-1}{n^3}NA_2^4\rho^4 \quad (5)$$

$$W_{focus\_out}(\rho) = \frac{1}{2}\Delta z_b NA_2^2 \rho^2 \quad (6)$$

where n is the refractive index of the transparent layer 41. The wavefront aberrations in equations (5) and (6) are expressed in terms of Seidel polynomials. The spherical aberration term proportional to $W_{disc}(\rho)$ of the wavefront aberration is compensated by the phase structure for NA<$NA_2$, while furthermore a focus offset of $\Delta z$ is generated by the phase structure. The position of the best focus for the outer sub-beam can be found from minimization of the optical path difference (OPD) of the outer sub-beam as a function of the defocus position $\Delta z_b$ $$OPD^2 = \frac{2\int_1^{\rho_1} W(\rho)^2 \rho d\rho}{\rho_1^2 - 1} - \left(\frac{2\int_1^{\rho_1} W(\rho)\rho d\rho}{\rho_1^2 - 1}\right)^2 \quad (7)$$

with $\rho_1$=$NA_1/NA_2$. The minimum OPD is obtained for $$\Delta z_b = \frac{1}{4}\Delta d\frac{n^2-1}{n^3}NA_2^2(1+\rho_1^2) \quad (8)$$

Figure 5:
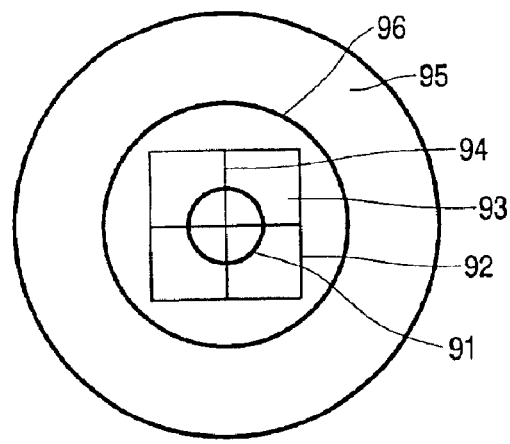
FIG. 5 shows a quadrant detector with intensity distributions.

For n=1.58, $NA_2$=0.5, $\rho_1$=1.2 and $\Delta d$=0.6 mm, the distance $\Delta z_b$ is equal to 34.7 μm. A more accurate ray-trace analysis of the optical system of FIG. 5 gives $\Delta z_b$ is equal to 34.8 μm. The value of $\Delta z_b$ is positive if the position of the outer focus has shifted away from the objective system due to the presence of the spherical aberration.

Equations (2) and (3) applied to the example yields a minimum distance of 12.5 μm between the focus of the central sub-beam and the focus of the outer sub-beam. When this is combined with the position of the focus of the outer sub-beam, i.e. $\Delta z_b$ is equal to 34.8 μm, the amount of defocus $\Delta z$ to be introduced in the central sub-beam by the phase structure such that the rays of the outer sub-beam do not fall on the radiation-sensitive surface of the detection system must comply with $\Delta z$<22.3 μm or $\Delta z$>47.3 μm.

In this specific example a proper defocus is obtained when $\Delta z$=0, where the phase structure introduces no defocus. A preferred value for $\Delta z$ depends on the manufacturability of the optical element.

The optical element is easier to make, if the concentric areas of the phase structure are broader. The areas are broader if the slope of $W(\rho)$ is smaller. According to third order aberration we find, when the phase structure introduces an amount of defocus of $\Delta z$, that the wavefront $W(\rho)$ that must be compensated by the phase structure is given by $$W(\rho) = -\frac{1}{8}\Delta d\frac{n^2-1}{n^3}NA_2^4\rho^4 + \frac{1}{2}\Delta z NA_2^2 \rho^2 \quad (9)$$

When $\Delta z$ is given by $$\Delta z = \frac{1}{4}\Delta d\frac{n^2-1}{n^3}NA_2^2 \quad (10)$$

then $W(1)$=0. For this value of W the wavefront is reasonably flat and the phase structure can be manufactured well. For the above example this yields $\Delta z$=14.2 μm. When $W(1)$>0, the slope of the wavefront becomes smaller, further improving the manufacturability but reducing the quality of the spatial filtering. Alternatively, when $W(1)$<0, the spatial filtering is improved but the manufacturability will become worse. A preferred value for $\Delta z$ is where the wavefront has the smallest maximum slope.

In this embodiment, the objective system 10 has a single lens for focusing an incoming parallel beam with wavelength $\lambda_1$=660 nm into a converging beam with NA=0.6, which forms through the transparent layer 3 a spot on the information layer. The free working distance in this embodiment is 1.290 nm. The thickness of the transparent layer is 0.6 mm and it is made of polycarbonate with a refractive index n=1.5803. The lens has a thickness on the optical axis of 1.922 mm and an entrance pupil diameter of 3.3 mm. The body of the lens is made of SFL56 Schott glass with refractive index n=1.7767. The convex surface of the lens body that is directed towards the collimator lens has a radius 2.32 mm. The lens has an aspherical shape in order to compensate for the spherical aberration incurred by the first radiation beam in the first transparent layer 3. The aspherical shape is realized by means of a thin layer of acryl on top of the glass body. The lacquer has refractive index n=1.5646. The thickness of this layer on the optical axis is 22 micrometer. The rotationally symmetric aspherical shape is given by the equation:

$$z(r) = B_{2i} r^{2i} \quad (11)$$

with z being the position of the surface along the optical axis in the direction of from the radiation source to the record carrier measured in millimeters, r the distance to the optical axis in millimeters, and $B_k$ the coefficient of the $k^{th}$ power of r. The value of the coefficients $B_2$ to $B_{14}$ are in this example 0.24134835, 0.0051012159, −0.00098850422, 0.00060334583, −0.00021740397, 1.9331367 $10^{-5}$ and 1.6587855 $10^{-6}$, respectively.

The optical element 16 is a non-periodic phase structure made in a flat PMMA plate having refractive index 1.4891 at 660 nm, which is arranged on the side of the objective lens facing the collimator lens. The zone height distribution is, from the optical axis 19 to the radius pertaining to the second numerical aperture, 0h, 5h, 4h, 3h, 2h, 3h, 4h, 5h and 0h, with the height $h_1$=1.349 μm. The zone boundaries are given by 0.3322 mm, 0.4893 mm, 0.6241 mm, 0.7728 mm, 1.1537 mm, 1.2413 mm, 1.3010 mm, 1.3497 mm, 1.3900 mm, respectively, the last radius corresponding to the second numerical aperture. The focal length of the servo lens is $F_{servo}$=11 mm.

The difference in height between neighbouring areas is equal to a multiple m of a height $h_1$ given by $$h_1 = \frac{\lambda_1}{n_1 - 1}$$

where $\lambda_1$ is the first wavelength and $n_1$ is the refractive index of the material of the annular area at the wavelength $\lambda_1$. The multiple m may be any integer value, e.g. −1, 0 or 1. The heights of the concentric areas relative to the height of the central area 53 are 0, 5, 4, 3, 2, 3, 4, 5 and 0 times $h_1$. The optical path difference (OPD) introduced by neighbouring areas of the phase structure in the first radiation beam of wavelength $\lambda_1$ traversing the optical element is equal to $mh_1(n_1-1)$, which is equal to $m\lambda_1$. As a consequence, the phase structure introduces a flat wavefront deviation to the first radiation beam. In other words, the phase structure does not affect the wavefront of the first radiation beam.

For the CD read/write operation the wavelength is $\lambda_2$=780 nm with NA=0.5. The refractive index for this wavelength of the replica layer of the objective lens is 1.5589, the glass body of the objective lens 1.7661, the PMMA plate 1.4862 and the polycarbonate transparent layer 41 1.5735. The thickness of the transparent layer 41 is 1.2 mm. The free working distance is 0.9550 mm. The entrance pupil radius complying with NA=0.5 is in this case 1.3900 mm.

When the second radiation beam passes through the optical element 16, its wavefront will be affected, because the radiation beam has a wavelength $\lambda_2$ different from $\lambda_1$, and the optical path differences introduced by the concentric areas are not equal to multiples of $\lambda_2$. The differences will now be determined for the specific phase structure of FIG. 2. The material of the concentric areas is polymethyl-metacrylate (PMMA), having a refractive index $n_1$ of 1.4891 for $\lambda_1$ equal to 660 nm and a refractive index $n_2$ of 1.4862 for $\lambda_2$ equal to 785 nm. Table I shows the fraction of the optical path difference OPD divided by $\lambda_2$, i.e. $\{mh_1(n_2-1) \bmod \lambda_2\}/\lambda_2$ for step heights of $mh_1$ and m having values from 1 to 6. Note, that the largest height in the table gives the smallest OPD.

TABLE I

| m | {OPD mod $\lambda_2$}/$\lambda_2$ |
|---|---|
| 1 | 0.8411 |
| 2 | 0.6823 |
| 3 | 0.5234 |
| 4 | 0.3645 |
| 5 | 0.2057 |
| 6 | 0.0468 |

The heights and radial extent of the annular areas have been chosen to introduce an amount of spherical aberration equal to the sum of the spherical aberration introduced in the converging beam 45 having a wavelength $\lambda_2$ and an $NA_2$ of 0.5 by a transparent layer of 1.2 mm and the compensation introduced by the objective system 18 in the beam 45. This sum is equal to the difference in spherical aberration due to the difference in thickness of the transparent layers of the record carriers. The sphero-chromatism of the objective system, i.e. the change in spherical aberration introduced by the objective system when the wavelength changes from $\lambda_1$ to $\lambda_2$ is an order of magnitude smaller than the difference in spherical aberration due to the difference in thickness, and is regarded as included in the mentioned difference. According to the invention an amount of 0.30 $\lambda$ defocus in terms of Zernike polynomials is added. The positive sign of the defocus indicates a larger distance between the focus of the central beam and the objective lens.

The phase structure introduces an amount of spherical aberration in the central sub-beam required to compensate for the thickness difference between the transparent layers 3 and 41 and for the change in the spherical aberration introduced by the objective lens due to the change in wavelength from $\lambda_1$ to $\lambda_2$, i.e. the sphero-chromatism of the objective lens. The phase structure also introduces an amount of defocus in the central sub-beam, that gives rise to focus offset $\Delta z$ equal to 14.2 μm, corresponding to W(1)=0.

The best focus position of the beam with NA>0.5 according to ray-trace calculations would have been obtained when the free working distance were 18.4 μm larger. The focus point of the outer sub-beam near the detection system lies therefore behind the detection plane, creating an annular radiation distribution in the detection plane having an inner radius of 80 μm. The distribution allows spatial filtering when a detection system is used that has a photo-sensitive area with a radius $R_d$=50 μm. When using this detector the absolute value of the focus offset between the inner and outer beam is preferably larger than 11.3 μm.

In the above example of the phase structure the best focus position of the outer sub-beam is 18.4 μm further away from the objective lens than that of the inner sub-beam, allowing a maximum detector radius of 80 μm. The focus offset between the central sub-beam and the outer sub-beam can be increased further by extending the non-periodic phase structure over the entire $NA_1$ aperture. Let the non-periodic phase structure for $NA<NA_2$ be the same as in the previous example. The non-periodic phase structure consist of three steps in the region $NA>NA_2$, or r>1.39 mm. The concentric areas between these steps range from 1.39–1.48 mm, 1.48–1.57 mm and 1.57–1.65 mm. The heights of these steps are $2h_1$, $1h_1$ and $0h_1$, respectively. The outer part of the non-periodic phase structure transforms the flat incoming outer sub-beam into a beam that globally approximates a divergent beam. The object distance of the objective lens for the outer sub-beam has changed from minus infinity to l=−1260.4 mm. The resulting focus shift $\Delta z_b$ in the image distance is then given by $$\Delta z_b = -\frac{F_{obj}^2}{l} \qquad (15)$$

resulting in $\Delta z_b$=6.0 μm. As a result, the best focus position of the outer sub-beam is now obtained when the free working distance between the objective lens and the disc is increased by 18.4 μm+6.0 μm=24.4 μm with respect to the focus point of the central sub-beam. The maximum allowed detector diameter is now increased to 105 μm.

The optical element with phase structure may be made by using the so-called replication process, in which a layer of lacquer, e.g. Diacryl, is deposited on a substrate, shaped by a mould provided with the negative of the phase structure profile, and hardened by UV illumination. Alternatively, the optical element may be made by injection moulding the entire element in a mould, one half of which is provided with the profile of the phase structure. The optical element may also be operated in reflection. In that case the above formula for $h_1$, must be replaced by $h_1=\lambda_1/2$ and Table I changed accordingly. The wavefront introduced by an actually made optical element can be determined either from a measurement of the wavefront of a radiation beam before and after the optical element or by measuring the height and extent of the concentric areas of the phase structure. In the latter case a polynomial function comprising defocus and spherical aberration terms is fitted through the stepped wavefront calculated from the dimensions of the phase structure.

The embodiment of the optical head shown in FIG. 1 may be adapted to form the focus error signal 30 by means of the astigmatic method, which method is known per se. Thereto the optical head is provided with lens 90, arranged in the optical path of the first and second radiation beam between the beam splitter 13 and the detection system 25. The lens is made of polycarbonate with a refractive index of 1.5734 at the second wavelength. It has a thickness of 0.9 mm on the optical axis. One surface of the lens is cylindrical with a radius of 15.5 mm, the other surface is spherical with a radius of 3.44 mm. The lens 90 causes the central sub-beam to form two focal lines lying 0.299 mm before and 0.355 mm behind the detection plane 25'. When the focus of the central sub-beam is located on the information layer 42, the substantially circular so-called spot of least confusion is in the detection plane and has a geometrical diameter D of 55 μm. This spot is the central intensity distribution 72 in FIG. 3B. The astigmatic focal lines have lengths of 2D. FIG. 5 shows the position of the central intensity distribution 91 on the radiation-sensitive area 92 of an embodiment of the detection system 25 in the form of a quadrant detector. The area 92 is divided into four equally large sub-areas 93 separated by two lines 94. The axis of the cylinder of the lens 90 makes an angle of 45° with the direction of the lines 94. As a consequence, the focal lines are oriented at 45° with respect to the sides of the square detector, and the radiation-sensitive area, if square, should have a size of L*L, where L is equal to about sqrt(2)*D or more. In this embodiment of the detection system the size of the area 92 L*L is 100 μm by 100 μm. The Figure shows the outer intensity distribution 95 in the detection plane. To prevent radiation of the outer intensity distribution to fall on the radiation-sensitive area, the inner diameter of the outer intensity distribution should be about sqrt(2)*L or larger. In this embodiment the inner diameter should be approximately sqrt(2)*100 μm=142 μm or larger. The edges of the radiation-sensitive area may extend a small distance into the outer radiation distribution, provided the amount of intercepted radiation of the outer radiation beam does not exceed the above-mentioned amount. The distance between the focus of the central sub-beam and that of the outer sub-beam as formed by the objective system must be at least 16 μm to achieve the desired inner diameter. This focus offset is of the same order of magnitude as the focus offset calculated in the above embodiment.

Figure 6:
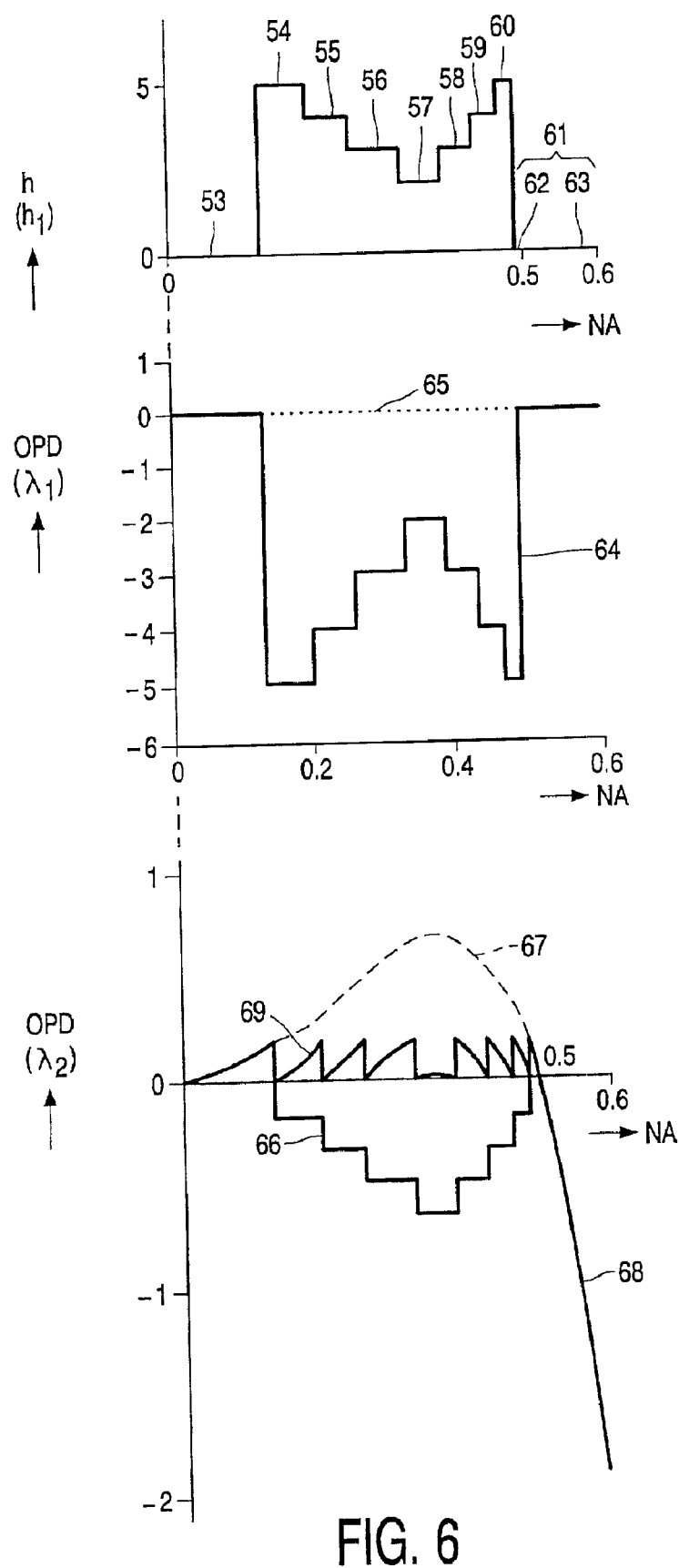
FIG. 6 shows a cross-section of the optical element and its optical path differences for two different wavelengths $\lambda_1$ and $\lambda_2$.

The spatial filtering may be further improved by making small corrections of the wavefront. This will be explained with reference to FIGS. 6 and 7. The top diagram of FIG. 6 shows the height h of the areas of the phase structure in units of $h_1$ as a function of the radius of the phase structure. Note, that the radii in FIGS. 6 and 7 may not correspond exactly with the radii of the areas in the embodiment described above. The phase structure in FIG. 6 does not comprise the features for the improved spatial filtering. The radius is expressed in terms of the numerical aperture NA of a ray in the radiation beam, the ray being at a distance equal to the radius from the central ray of the radiation beam. The relation between the radius r and the numerical aperture NA in air for lenses complying with the so-called sine condition is given by NA=r/f, where f is the focal distance of the objective system 18. The Figure shows the NA of 0.5 and 0.6 for the CD and DVD, respectively. Outside area 60 lies an area 62 having zero height and extending up to $NA_2$. Together with the zero-height area 63 it forms the area 61. The drawn line 64 in the middle diagram of FIG. 6 shows the OPD or wavefront deviation introduced in the first radiation beam by the phase structure, the OPD being relative to the optical path of the central ray of the beam in units of $\lambda_1$. The OPDs of the areas 54 to 60 are negative, because the rays are retarded by the phase structure shown in FIG. 2. In other words, the shape of the phase structure is concave in parts where the introduced wavefront deviation is convex. The dashed line 65 in the middle diagram shows the wavefront deviation introduced in the first radiation beam after transmission through the optical element. The wavefront deviation is both globally and locally flat, showing that the optical element does not affect the first radiation beam. The objective system 18 introduces an amount of spherical aberration required for the compensation of the spherical aberration incurred by the first radiation beam in the transparent layer 3 of the first type of record carrier. Hence, the first radiation beam after passage through the optical element 16 and the objective system 18 is correctly compensated for the record carrier of the first type.

The wavefront deviation introduced by the optical element in the second radiation beam is shown by the drawn curve 66 in the bottom diagram of FIG. 6. The OPD along the vertical axis is given in units of $\lambda_2$. The dashed-drawn curve 67–68 is the difference in spherical aberration due to the difference in thickness of the transparent layers of the record carriers. This difference in spherical aberration must be compensated by the optical element 16 up to $NA_2$=0.50, i.e. up to the numerical aperture of second radiation beam with which the second type of record carrier is scanned. The bottom diagram shows, that the stepped wavefront 66 globally approximates the desired spherical aberration 67. However, the approximation is not correct at a local level, i.e. at the level of the concentric areas: each area gives a flat wavefront deviation, whereas the desired wavefront deviation for that area is in general not flat. This discrepancy at the local level causes the correction of the spherical aberration to be not perfect, as shown by the saw-tooth-shaped line 69 in the bottom diagram. This line is the wavefront near the focal spot 47, measured in units of $\lambda_2$. The wavefront is the difference between the wavefront 67 to be corrected and the actual wavefront correction 66 of the optical element.

The imperfect correction of the second radiation beam affects the detection of the radiation beam returning from the record carrier 40 by the detection system 25. If the wavefront of the beam coming from the optical element 16 and travelling towards the detection system was flat, the collimator lens 14 would focus the rays that make up the beam correctly on the intersection of the central ray of the radiation beam and the detection system. Although the optical element has substantially reduced the phase error of the wavefront due to the spherical aberration, it has not changed the gradient or slope of the wavefront. Since the local normal on the wavefront is the direction of a ray in the radiation beam, the direction of a ray can be found from the normal on the saw-tooth profile 69. The direction corresponding to the profile 69, where spherical aberration is corrected, is the same as for the profile 67, where spherical aberration is not corrected. The direction of the rays is such that for NA smaller than about 0.35 the rays cross the central ray of the radiation beam closer to the objective system 18 than the rays with NA larger than about 0.35. This causes a broadening of the central and outer intensity distributions in the detection plane.

Figure 7:
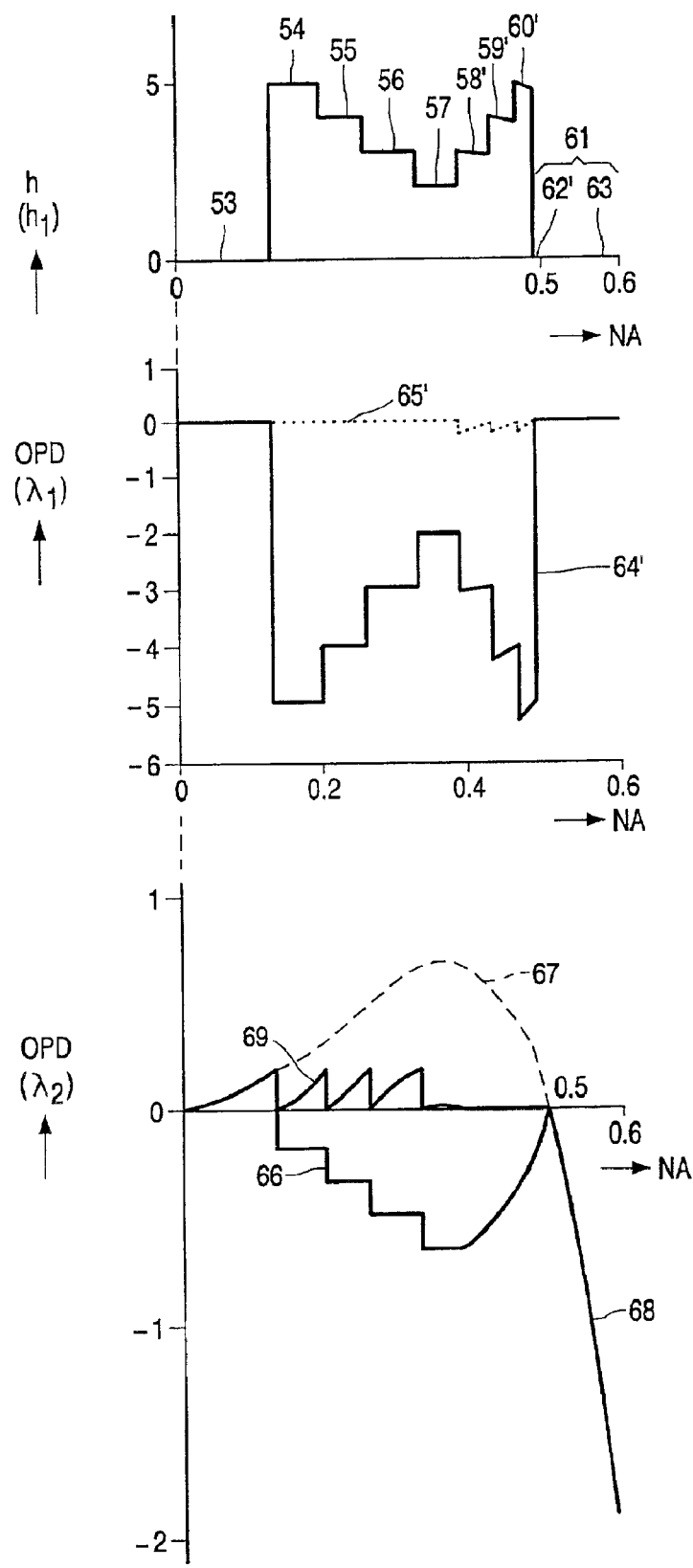
FIG. 7 shows the same diagrams as FIG. 6 for the optical element having slanting areas in the phase structure.

FIG. 7 shows the same diagrams as FIG. 6, but the phase structure is provided with the features for an improved spatial filtering. The cross-section of the phase structure is shown in the top diagram of FIG. 5. The structure has level upper sides in the areas 54 to 57, as in the phase structure shown in FIG. 6. The areas 58', 59', and 60' have slanting upper sides instead of level upper sides. Likewise, area 60' has a slanting upper side. The middle diagram of FIG. 7 shows that the wavefront 65' for the first radiation beam globally approximates a flat wavefront as required for compensation of the spherical aberration incurred by the first radiation beam when traversing the transparent layer 3. However, locally, the compensation is only correct for areas 53 to 57, where each of the areas forms a substantially flat wavefront. The compensation is not perfect for areas 58' to 60' and 62', showing small saw-teeth in the wavefront, as drawn in the Figure. This imperfect compensation reduces the so-called Strehl intensity of the spot 21 from 1.00 to 0.93, which is a deterioration of the spot that is not significant for scanning record carrier 2.

The bottom diagram of FIG. 7 shows the OPDs of the areas for the second radiation beam. The compensation of the areas 53 to 57 is not perfect, similar to that of the conventional phase structure. The slanting of the upper sides of the phase structure in the areas 58' to 61' is chosen to form a wavefront that locally is equal to the difference in spherical aberration 67, thereby giving a near perfect compensation. This is shown in the Figure by the flat wavefront 69 between NA=0.35 and 0.5. There is no compensation in the area 63, for rays having a numerical aperture larger than $NA_1$, resulting in a large gradient in the wavefront characteristic for spherical aberration. The transition in compensation from area 61' to area 62 causes a discontinuity in the gradient of the wavefront, shown in the bottom diagram by the bend in the OPD 69' at $NA_2$=0.50. The rays having an NA between 0.35 and 0.50 are directed to the intersection of the central ray and the detection plane. These rays focus properly on the detection system 25, close to the rays having an NA smaller than about 0.35. The rays having an NA larger than 0.50 are directed to a position further away from the objective system. The effect of the redirection of the rays is a stronger concentration of the rays in the central and outer intensity distribution, causing a broader and/or darker area between the two intensity distribution and an improved spatial filtering.

Although the phase grating is arranged on or in a plate 50 in the embodiment shown in FIG. 1, the phase grating may also be arranged on or in any other optical element, such as the collimator lens 14, the beam splitter 13, in particular if it is a cube beam splitter, or the objective system 18, preferably on a surface of a lens of the system facing the radiation source 10.

What is claimed is:

1. An optical head for scanning a first optical record carrier including a first information layer and a first transparent layer having a first thickness and for scanning a second optical record carrier including a scoond information layer and a second transparent layer having a second thickness different from the first thickness, the head including: a radiation source for generating a first radiation beam having a first wavelength and a second radiation beam having a second wavelength different from the first wavelength, the second radiation beam including a central sub-beam and an outer sub-beam, an optical system for converging the first radiation beam through the first transparent layer to a focus on the first information layer and for converging the second radiation beam through the second transparent layer to a focus on the second information layer, and a detection system for receiving radiation of the first and second radiation beam from the information layer and including a photo-sensitive area arranged in a detection plane;

the optical system including an optical element having a non-periodic phase structure, the phase structure including a plurality of concentric areas inducing a wavefront deviation and inducing a wavefront deviation in the central sub-beam that compensates the difference in spherical aberration due to the first and second transparent layer, wherein the phase structure introduces a defocus in the central sub-beam, wherein the optical element is transparent for the first radiation beam, the central sub-beam and the outer sub-beam, and that the wavefront deviation induced in the second radiation beam is such that, when the focus of the central sub-beam is located on the second information layer, the radiation of the central sub-beam and the outer sub-beam form a central intensity distribution and an outer intensity distribution, respectively, in the detection plane, the central intensity distribution and the outer intensity distribution being separated by a substantially dark area, and the photo-sensitive area captures radiation of substantially only the central distribution.

2. The optical head according to claim 1, wherein the photo-sensitive area has an edge arranged in the dark area of the intensity distribution.

3. The optical head according to claim 1, wherein the phase structure induces a wavefront deviation in the second radiation beam that globally approximates spherical aberration and defocus, the defocus changing the axial distance between the focus of the central sub-beam and the focus of the outer sub-beam.

4. The optical head according to claim 1, wherein the phase structure introduces a defocus in the outer sub-beam.

5. The optical head according to claim 1, wherein the axial distance between the focus of the central sub-beam and the focus of the outer sub-beam is at least 12.5 μm.

6. A device for scanning two types of optical record carrier, the device including an optical head according to claim 1 and an information processing unit for error correction.

7. An optical head for scanning multiple record carrier types, the head including: a radiation source for generating a first radiation beam having a first wavelength and a second radiation beam having a second wavelength different from the first wavelength, the second radiation beam including a central sub-beam and an outer sub-beam;

an optical system for converging the first radiation beam upon a first media type to a focus and for converging the second radiation beam through upon a second media type, the optical system including an optical element having a non-periodic phase structure, the phase structure including a plurality of concentric areas inducing a wavefront deviation in the first radiation beam that globally approximatas a flat wavefront deviation and inducing a wavefront deviation in the central sub-beam that compensates the difference in spherical aberration due to the first and second media types, wherein the optical element is transparent for the first radiation beam, the central sub-beam and the outer sub-beam, and wherein the phase structure introduces a defocus in the central sub-beam;

a detection system for receiving radiation of the first and second radiation beam from the first and secoed media types including a photo-sensitive area arranged in a detection plane; and wherein the wavefront deviation induced in the second radiation beam is such that, when the focus of the central sub-beam is located on the second information layer, the radiation of the central sub-beam and the outer sub-beam form a central intensity distribution and an outer intensity distribution, respectively, in the detection plane, the central intensity distribution and the outer intensity distribution being eparated by a substantially dark area, and the photo-sensitive area captures radiation of substantially only the central distribution.

8. The optical head according to claim 7, wherein the photo-sensitive area has an edge arranged in the dark area of the intensity distribution.

9. The optical head according to claim 7, wherein the phase structure induces a wavefront deviation in the second radiation beam that globally approximates spherical aberration and defocus, the defocus changing the axial distance between the focus of the central sub-beam and the focus of the outer sub-beam.

10. The optical head according to claim 7, wherein the phase structure introduces a defocus in the outer sub-beam.

11. The optical head according to claim 7, wherein the axial distance between the focus of the central sub-beam and the focus of the outer sub-beam is at least 12.5 μm.

12. A device for scanning first and second media types, wherein the device includes an optical head according to claim 7, and an information processing unit for error correction.

13. The optical head according to claim 7, wherein the phase structure compensates for spherical aberrations in the central sub-beam due to different media types.

14. The optical head according to claim 7, wherein the phase structure compensates for spherical aberrations in the central sub-beam due to the first and the second transparent layers.

* * * * *